United States Patent
Ahn et al.

(10) Patent No.: US 10,645,539 B2
(45) Date of Patent: May 5, 2020

(54) COMMUNICATION METHOD USING DEVICE GROUP AND DEVICE USING SAME

(71) Applicant: LG ELECTRONICS INC., Seoul (KR)

(72) Inventors: Joonkui Ahn, Seoul (KR); Bonghoe Kim, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 165 days.

(21) Appl. No.: 15/755,789

(22) PCT Filed: Aug. 31, 2016

(86) PCT No.: PCT/KR2016/009713
§ 371 (c)(1),
(2) Date: Feb. 27, 2018

(87) PCT Pub. No.: WO2017/039310
PCT Pub. Date: Mar. 9, 2017

(65) Prior Publication Data
US 2018/0332438 A1    Nov. 15, 2018

Related U.S. Application Data

(60) Provisional application No. 62/211,878, filed on Aug. 31, 2015.

(51) Int. Cl.
*H04W 4/06* (2009.01)
*H04W 76/14* (2018.01)
*H04W 76/10* (2018.01)
*H04W 88/06* (2009.01)
*H04W 76/30* (2018.01)
(Continued)

(52) U.S. Cl.
CPC ............... *H04W 4/06* (2013.01); *H04W 8/24* (2013.01); *H04W 76/10* (2018.02); *H04W 76/14* (2018.02); *H04W 76/27* (2018.02); *H04W 76/30* (2018.02); *H04W 88/06* (2013.01); *H04W 8/186* (2013.01); *H04W 36/0009* (2018.08); *H04W 88/04* (2013.01)

(58) Field of Classification Search
None
See application file for complete search history.

(56) References Cited

U.S. PATENT DOCUMENTS

| | | | | |
|---|---|---|---|---|
| 2012/0300752 A1* | 11/2012 | Kwon | ................ | H04W 56/005 370/336 |
| 2013/0183971 A1* | 7/2013 | Tamaki | ............. | H04W 36/0061 455/436 |

(Continued)

FOREIGN PATENT DOCUMENTS

| KR | 10-2012-0120109 A | 11/2012 |
|---|---|---|
| KR | 10-2013-0082447 A | 7/2013 |
| WO | WO 2015/102445 A1 | 7/2015 |

*Primary Examiner* — Kenny S Lin
(74) *Attorney, Agent, or Firm* — Birch, Stewart, Kolasch & Birch, LLP

(57) ABSTRACT

Provided is a communication method using a device group, which includes a first device and a second device, in a wireless communication system. The first device establishes radio resource control (RRC) connection with a base station instead of the second device, and shares the RRC connection with the second device.

6 Claims, 4 Drawing Sheets

(51) Int. Cl.
  *H04W 76/27*  (2018.01)
  *H04W 8/24*  (2009.01)
  *H04W 88/04*  (2009.01)
  *H04W 36/00*  (2009.01)
  *H04W 8/18*  (2009.01)

(56) References Cited

U.S. PATENT DOCUMENTS

| | | | |
|---|---|---|---|
| 2013/0258958 A1* | 10/2013 | Dinan | H04W 56/0045 370/329 |
| 2013/0324114 A1 | 12/2013 | Raghothaman et al. | |
| 2013/0336296 A1* | 12/2013 | Dinan | H04W 72/0406 370/336 |
| 2014/0161002 A1* | 6/2014 | Gauvreau | H04L 1/1893 370/280 |
| 2014/0348122 A1 | 11/2014 | Li et al. | |
| 2015/0296509 A1* | 10/2015 | Yang | H04W 76/28 370/280 |
| 2016/0135203 A1* | 5/2016 | Kim | H04W 48/20 370/315 |
| 2016/0234670 A1* | 8/2016 | Zhang | H04W 8/005 |
| 2017/0208095 A1* | 7/2017 | Wei | H04L 63/20 |
| 2018/0124674 A1* | 5/2018 | Vutukuri | H04W 36/30 |
| 2018/0132059 A1* | 5/2018 | Kim | H04W 4/023 |
| 2019/0014490 A1* | 1/2019 | Kim | H04W 24/02 |

\* cited by examiner

COMMUNICATION METHOD USING DEVICE GROUP AND DEVICE USING SAME

CROSS REFERENCE TO RELATED APPLICATIONS

This application is the National Phase of PCT International Application No. PCT/KR2016/009713, filed on Aug. 31, 2016, which claims priority under 35 U.S.C. 119(e) to U.S. Provisional Application No. 62/211,878, filed on Aug. 31, 2015, all of which are hereby expressly incorporated by reference into the present application.

BACKGROUND OF THE INVENTION

Field of the Invention

The present invention relates to wireless communication and, most particularly, to a communication method using a device group in a wireless communication system and a device using the same.

Related Art

A variety of mobile device supporting diverse wireless communication protocols are being introduced. For example, a smart phone may support 3rd Generation Partnership Project (3GPP) Long Term Evolution (LTE), WiFi, and Bluetooth at the same time. Additionally, apart from smart phones, a variety of devices including wearable devices, such as smart watches, smart glasses, bio sensors, and so on, vehicle-mounted infotainment systems, such as navigation systems, video players, and so on, and Internet of Things (IoT) devices being interconnected to household electric appliances, are being introduced.

A situation in which multiple mobile devices are used by the same user are operated in adjacent locations being close enough to perform wireless communication by using device-to-device low-power communication protocols (e.g., WiFi, Bluetooth, LTE D2D, and so on) or to perform wired communication has become very common. For example, a smart phone and a smart watch, which are used by the same user, are carried and worn by the corresponding user at the same time. Even when the user moves (or relocates) to a different location, the smart phone and the smart watch may maintain their close-ranged locations and may move in accordance with the movement of the corresponding user, while being capable of performing direct low-power communication between one another.

When each of a plurality of devices independently performs communication with an LTE base station, the amount of information (or information size) that should be managed by the LTE network and the used capacity (or size) of the radio resources in order to perform such management increases in proportion to the number of connected devices.

A method for efficiently managing a plurality of devices operating within close range between one another in a wireless network is being required.

SUMMARY OF THE INVENTION

The present invention provides a communication method using a device group, which includes a primary device and a secondary device, in a wireless communication system and a device using the same.

In an aspect, a method for communicating using a device group in a wireless communication system is provided. The device group includes a primary device and a secondary device. The method includes establishing, by the primary device in the device group, a radio resource control (RRC) connection with a base station instead of the secondary device, sharing, by the primary device, the RRC connection with the secondary device, and communicating, by the primary device, with the base station based on the RRC connection.

In another aspect, a device for a wireless communication system includes a transceiver configured to transmit and receive radio signals, and a processor being operatively connected to the transceiver. The processor is configured to establish a radio resource control (RRC) connection with a base station instead of a secondary device in a device group to which the device belongs, share the RRC connection with the secondary device through the transceiver, and communicate with the base station based on the RRC connection through the transceiver.

In an environment where diverse communication protocols exist, low-power communication may be performed.

DESCRIPTION OF EXEMPLARY EMBODIMENTS

A mobile device may be fixed or may have mobility, and a mobile device may also be referred to as a wireless device, a user equipment (UE), a mobile station (MS), a mobile terminal (MT), a user terminal (UT), a subscriber station (SS), a personal digital assistant (PDA), a wireless modem, a handheld device, and so on. The mobile device may be implemented as part of a wearable device, such as a smart phone, a tablet PC, a smart watch, and so on, a vehicle-mounted infotainment device, such as a navigation system, a video player, and so on, an Internet of Things (IoT) device, and so on.

The proposed exemplary embodiment of the present invention may support diverse wireless communication protocols. For example, the mobile device may support Long Term Evolution (LTE)/LTE-Advanced (LTE-A), which is based on 3rd Generation Partnership Project (3GPP) Technical Specification (TS), and may also support Wi-Fi (also referred to as Wireless Local Area Network (WLAN)), Bluetooth, ZigBee, and so on, which are based on an Institute of Electrical and Electronics Engineers (IEEE) 802.11 standard specification.

A base station (BS) generally refers to a fixed station that communicates with a mobile device. Herein, the base station (BS) may also be referred to as an evolved-NodeB (eNB), a Base Transceiver System (BTS), an Access Point (AP), and so on.

Figure 1:
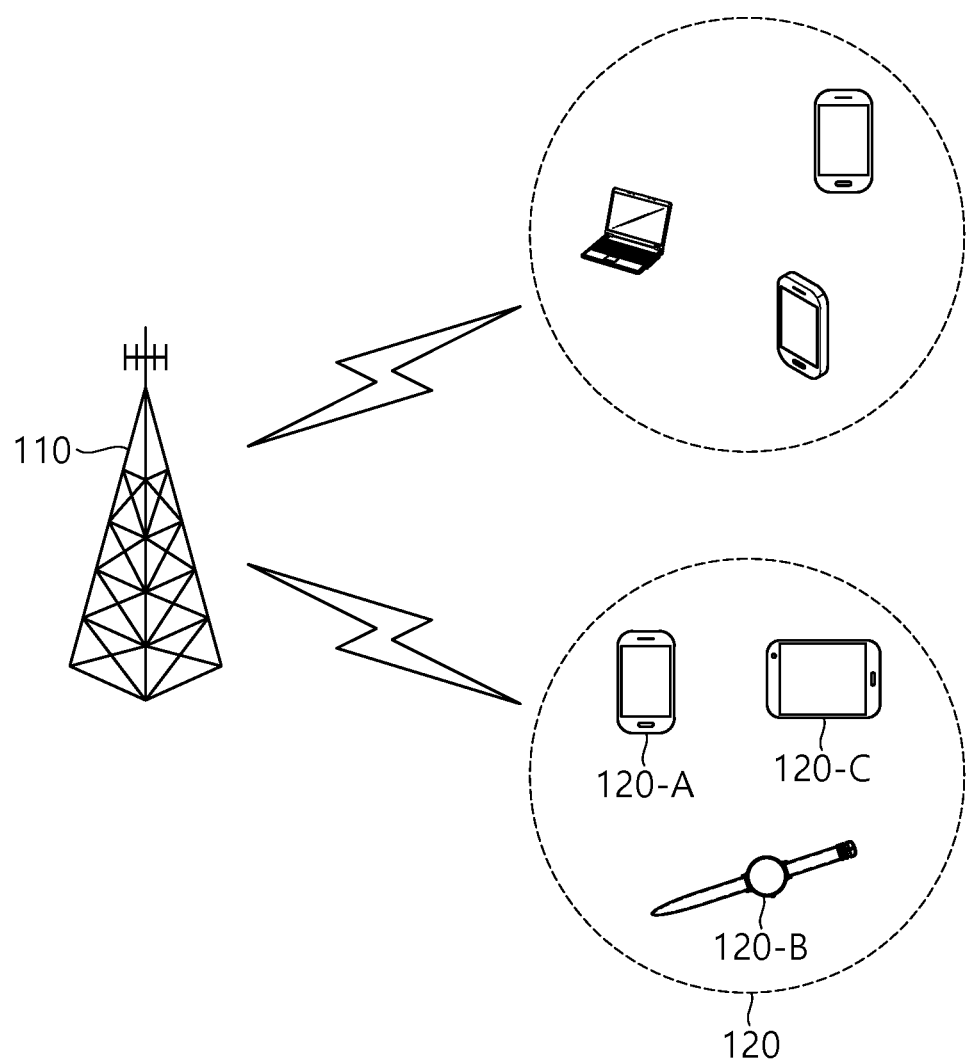
FIG. 1 shows a wireless communication system adopting an exemplary embodiment of the present invention.

FIG. 1 shows a wireless communication system adopting an exemplary embodiment of the present invention.

One or more device groups 120 exist in a coverage within a base station 110. A device group 120 includes a plurality of mobile devices 120-A, 120-B, and 120-C. Each mobile device may communicate with the base station 110.

The mobile devices included in the device group 120 and the base station 110 may communicate with one another based on a first communication protocol. The mobile devices included in the device group 120 may perform direct communication based on a second communication protocol. In order to clarify the description of the present invention, the first communication protocol will be referred to as LTE, and the second communication protocol will be referred to as WiFi. However, the present invention will not be limited only to this.

Among the plurality of mobile devices, one mobile device 120-A will be referred to as a primary device, and the remaining devices 120-B and 120-C will be referred to as a secondary device. For example, it will be assumed that a user is carrying a smart phone 120-A and wearing a smart watch 120-B, and, in this case, the smart phone 120-A will be referred to as the primary device, and the smart watch 120-B will be referred to as the secondary device. Both the smart phone 120-A and the smart watch 120-B may have the capability to perform communication with the LTE base station, and low-power wireless communication may be performed between the smart phone 120-A and the smart watch 120-B through a Bluetooth or WiFi connection.

The primary device and the secondary device may share a single control information or procedure. The primary device may transmit and/or receive control information and may perform a connection procedure. The secondary device follows the control information acquired by the primary device and the connection procedure of the primary device when performing communication with the base station. Herein, the primary device may perform radio resource control (RRC) connection, radio link management, Radio Resource Management (RRM), and so on, and the secondary device may communicate with the base station based on the control information of the primary device. Additionally, the secondary device may perform uplink (UL) transmission based on an uplink (UL) transmission timing, UL transmission power, and so on, of the primary device.

Figure 2:
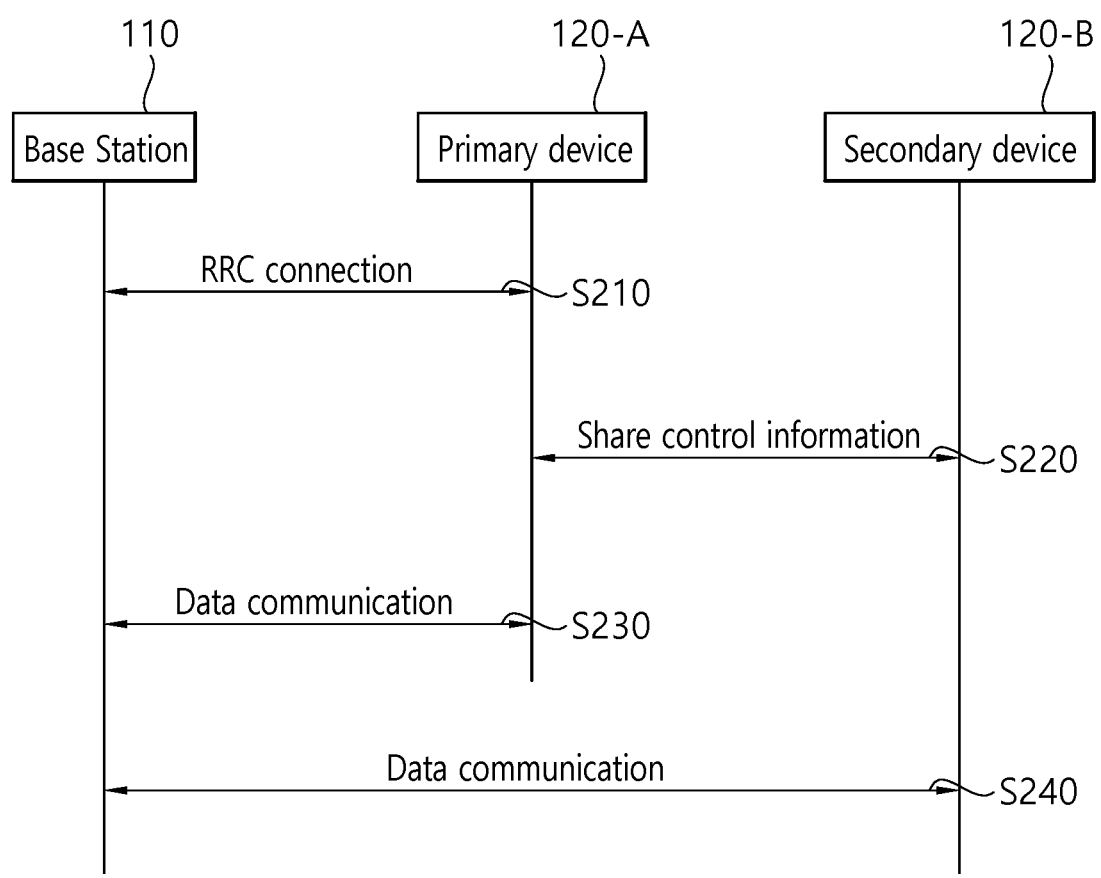
FIG. 2 shows a communication method according to an exemplary embodiment of the present invention.

FIG. 2 shows a communication method according to an exemplary embodiment of the present invention.

In step S210, the primary device 120-A establishes an RRC connection with the LTE base station 110. The primary device 120-A may also establish an RRC connection with a secondary device 120-B, which is included in the device group, along with the RRC connection between the primary device 120-A and the LTE base station 110, or separately. The RRC connection may be established based on an exchange of RRC request and RRC response. During the RRC connection, the primary device 120-A may acquire an identifier (ID) of the device group, an ID of the primary device 120-A, and an ID of the secondary device 120-B.

In step S220, the primary device 120-A may exchange the control information, which is acquired during the RRC connection, with the secondary device 120-B.

Although the primary device 120-A maintains a user plane and a control plane with the LTE base station 110, the secondary device 120-B may only maintain the user plane with the LTE base station 110. The primary device 120-A provides the control information that is required by another mobile device included in the device group 120 for its communication with the LTE base station 110.

In step S230, the primary device 120-A performs data communication with the LTE base station 110. The primary device 120-A may receive downlink (DL) data from the LTE base station 110 or may transmit UL data to the LTE base station 110.

In step S240, the secondary device 120-B performs data communication with the LTE base station 110. The secondary device 120-B may receive DL data from the LTE base station 110 or may transmit UL data to the LTE base station 110.

The mobile devices that belong to the device group may be managed by the LTE base station using a radio link. A quality of the radio link of the device group is maintained based on a radio channel quality between the base station and the primary device, and, in case the RRC connection is disconnected from the primary device due to reasons, such as a degradation in a DL channel quality, the connection of all mobile devices included in the corresponding device group may be disconnected.

The mobile devices that belong to the device group may perform the same handover or cell reselection. If the primary device changes (or switches) the base station to which it is connected, all of the secondary devices included in the corresponding device group are connected to the changed (or switched) base station.

Only the primary device may perform cell search, and the primary device may report its search result to the base station.

Only the primary device may perform RRM measurement, and the primary device may report its measurement result to the base station. The RRM measurement result may include at least any one of a Reference Signal Received Power (RSRP), a Reference Signal Received Quality (RSRQ), a Received Signal Strength Indicator (RSSI), and an interference size. The secondary device may not perform the RRM measurement, or the secondary device may notify its RRM measurement result to the primary device, and the primary device may report the result to the base station.

The primary device may receive a timing advance command (TAC) for adjusting UL time alignment from the base station. This is referred to as a basic TAC. The secondary device may correct the UL time alignment based on the basic TAC. The secondary device may correct the UL time alignment based on the TAC that is delivered from the primary device without performing a random access procedure for the UL time alignment correction with the base station. The secondary device may directly apply the TAC without any modification, or the secondary device may add an offset value to the TAC and may, then, apply the newly calculated value.

The primary device receives a UL transmission power adjustment command and configures a UL transmission power. This is referred to as a basic UL transmission power adjustment command. The secondary device may adjust the UL transmission power based on the basic UL transmission power adjustment command. The secondary device may directly apply the basic UL transmission power adjustment command without modification, or the secondary device may add an offset value to the basic UL transmission power adjustment command and may, then, apply the newly calculated value. Alternatively, the secondary device may use a DL path loss value, which is measured by the primary device, for configuring the UL transmission power.

The data communication of each of the primary device and the secondary device with the base station may be performed by using the methods described below.

According to a first exemplary embodiment, multiple mobile devices included in a device group may use carriers (or frequencies) each being different from one another. A unique carrier ID is assigned to each mobile device. DL/UL allocation information being transmitted from the base station may include a carrier ID, and each mobile device may use the corresponding carrier ID so as to be capable of identifying whether or not the DL/UL allocation information is intended for (or designated to) the corresponding mobile device. For example, a DL grant within a physical downlink control channel (PDCCH) includes a carrier ID and DL allocation information. When the carrier ID of the DL grant indicates the carrier that is used by a specific mobile device, the corresponding mobile device may use the corresponding DL allocation information so as to receive the DL data from the base station.

According to a second exemplary embodiment, multiple mobile devices included in a device group may use IDs each being different from one another. A unique ID is assigned to each mobile device. For example, a unique Cell-Radio Network Temporary Identifier (C-RNTI) may be allocated to each mobile device. Each mobile device decodes control information within the PDCCH based on the C-RNTI. Then, if an error is not detected, each mobile device may identify its own control information.

Each of the primary device and the secondary device included in the device group may have a different data communication capability. For example, the data communication capability may include a maximum transmission/reception data size, a number of transmitting/receiving antennas, a maximum number of multiplexable spatial layers, a maximum number of cells capable of performing aggregation, and/or a frequency bandwidth capable of performing transmission/reception. In addition to its own capability, the primary device transmits the capability of the secondary device to the base station. The base station may perform data communication within a range that is suitable for the capability of each secondary device. For example, the base station may perform PDSCH/PUSCH scheduling that is adequate for the capability of the secondary device of the base station.

Figure 3:
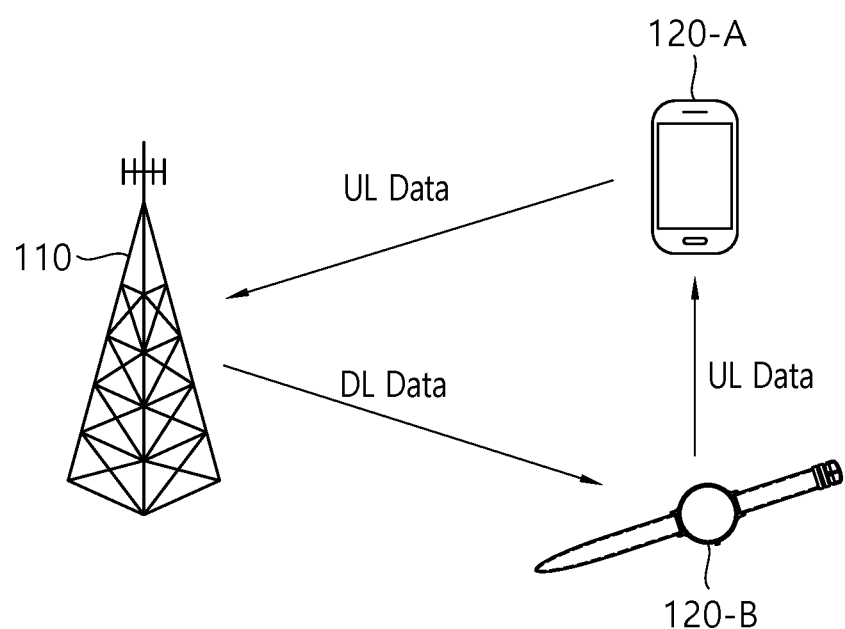
FIG. 3 shows a data communication method according to an exemplary embodiment of the present invention.

FIG. 3 shows a data communication method according to an exemplary embodiment of the present invention.

Due to a low-power or low-cost radio frequency (RF) unit, the secondary device 120-B may directly perform DL communication with the base station 110. However, the secondary device 120-B may perform UL communication through the primary device 120-A. The primary device may forward the UL transmission of all secondary devices that belong to the device group. The secondary device sends the UL data to the primary device, and the primary device may forward the corresponding UL data to the base station.

The secondary device 120-B delivers the UL data to the primary device in specific block units. The primary device 120-A delivers a scheduling request or buffer status report information, which are used for the transmission of the UL data, to the base station 110. Alternatively, the secondary device 120-B may send the scheduling request or buffer status report information to the primary device 120-A, and the primary device 120-A may then forward this to the base station 110. The primary device 120-A receives the UL scheduling from the base station 110 and transmits the UL data of the secondary device 120-B to the base station 110.

The secondary device 120-B may directly receive the DL data from the base station 110. The secondary device 120-B sends a hybrid automatic repeat request (HARQ) ACK/NACK corresponding to the received DL data to the primary device 120-A. The primary device 120-A may send the HARQ ACK/NACK of the secondary device 120-B to the base station 110. However, it may not be convenient for the primary device 120-A to transmit the HARQ ACK/NACK of the secondary device 120-B each time. The primary device 120-A may collect multiple HARQ ACK/NACKs from multiple secondary devices, or the primary device 120-A may collect multiple HARQ ACK/NACKs from one secondary device. The primary device 120-A may transmit the collected multiple HARQ ACK/NACKs to the base station 110 all at once.

Alternatively, the secondary device 120-B may omit the HARQ operation. This indicates that the HARQ ACK/NACK is not transmitted. The secondary device 120-B may perform only an automatic repeat request (ARQ) operation in a radio link control (RLC) layer. The RLC layer of the primary device 120-A receives an ACK/NACK from the RLC layer of the secondary device 120-B, which may then be transmitted to the base station 110.

The secondary device 120-B measures a DL channel status and sends the measured result to the primary device 120-A. The primary device 120-A may report the DL channel status it has directly measured and/or the DL channel status, which is received from the secondary device 120-B, to the base station.

Figure 4:
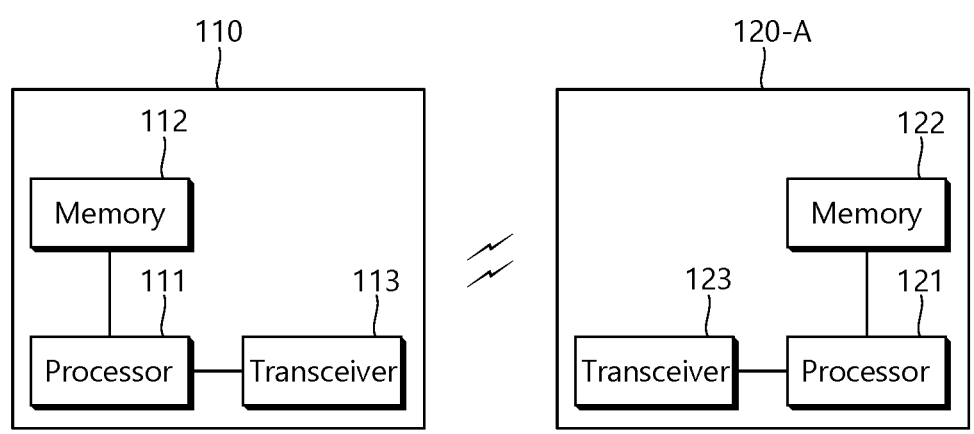
FIG. 4 is a block view showing a wireless communication system, in which the exemplary embodiment of the present invention is implemented.

FIG. 4 is a block view showing a wireless communication system, in which the exemplary embodiment of the present invention is implemented.

The base station 110 includes a processor 111, a memory 112, and a transceiver 113. The memory 112 is operatively connected to the processor 111 and stores diverse instructions being executed by the processor 111. The transceiver 113 is operatively connected to the processor 111 and transmits and/or receives radio signals. The processor 111 implements the proposed functions, processes, and/or methods. When the above-described exemplary embodiment is implemented by a software instruction, the instruction is stored in the memory 112 and executed by the processor 111. Thus, the above-described operation may be carried out.

The mobile device 120-A includes a processor 121, a memory 122, and a transceiver 123. The mobile device 120-A may perform functions of a primary device or a secondary device. The memory 122 is operatively connected to the processor 121 and stores diverse instructions being executed by the processor 121. The transceiver 123 is operatively connected to the processor 121 and transmits and/or receives radio signals. The processor 121 implements the proposed functions, processes, and/or methods. In the above-described exemplary embodiment, operations of the mobile device may be implemented by the processor 121.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for communicating using a device group in a wireless communication system, the device group including a primary device and a secondary device, the method performed by the secondary device comprising:

establishing a wireless connection with the primary device based on a second communication protocol;

establishing a radio resource control (RRC) connection with a base station through the primary device based on a first communication protocol;

receiving a timing advance command (TAC) of the primary device from the primary device, the TAC being used by the primary device to adjust uplink time alignment; and transmitting directly a physical uplink shared channel (PUSCH) to the base station based the TAC.

2. The method of claim 1, further comprising:

receiving information about a downlink pathloss measured by the primary device from the primary device, wherein a transmission power of the PUSCH is calculated based on the downlink pathloss.

3. The method of claim 1, wherein the first communication protocol is based on long term evolution (LTE), and the second communication protocol is based on bluetooth or WiFi.

4. A device for a wireless communication system, the device comprising:

a transceiver configured to transmit and receive radio signals; and a processor being operatively connected to the transceiver and configured to:

instruct the transceiver to establish a wireless connection with a primary device based on a second communication protocol;

instruct the transceiver to establish a radio resource control (RRC) connection with a base station through the primary device based on a first communication protocol;

instruct the transceiver to receive a timing advance command (TAC) of the primary device from the primary device, the TAC being used by the primary device to adjust uplink time alignment; and instruct the transceiver to transmit directly a physical uplink shared channel (PUSCH) to the base station based the TAC.

5. The device of claim 4, wherein the processor is further configured to instruct the transceiver to receive information about a downlink pathloss measured by the primary device from the primary device, and wherein a transmission power of the PUSCH is calculated based on the downlink pathloss.

6. The device of claim 4, wherein the first communication protocol is based on long term evolution (LTE), and the second communication protocol is based on bluetooth or WiFi.

* * * * *